Dec. 28, 1937.  E. L. HARDER  2,103,782
REGULATOR
Filed March 20, 1937   2 Sheets-Sheet 1

WITNESSES:
Wm. B. Sellers.
J. E. Hardy

INVENTOR
Edwin L. Harder.
BY
Ezra W. Savage
ATTORNEY

Dec. 28, 1937.     E. L. HARDER     2,103,782
REGULATOR
Filed March 20, 1937      2 Sheets-Sheet 2

WITNESSES:
Wm. B. Sellers.
F. E. Hardy

INVENTOR
Edwin L. Harder.
BY
Ezra W. Savage
ATTORNEY

Patented Dec. 28, 1937

2,103,782

UNITED STATES PATENT OFFICE 2,103,782

REGULATOR

Edwin L. Harder, Forest Hills, Pa., assignor to Westinghouse Electric & Manufacturing Company, East Pittsburgh, Pa., a corporation of Pennsylvania Application March 20, 1937, Serial No. 132,071

9 Claims. (Cl. 171—229)

My invention relates to regulating systems, and particularly to such systems for controlling the excitation of an exciter generator over a large range.

One object of my invention is the provision of a regulator system provided with field resistance connections capable of reducing the field current of a regulated machine to zero or to negative values.

Another object of my invention is the provision of a regulator system of the above indicated character having the advantage of the high economy characteristic of a series rheostatic regulator at high excitation currents, and the advantages of flexibility of control characteristic of a potentiometer connected field winding.

Figure 1:
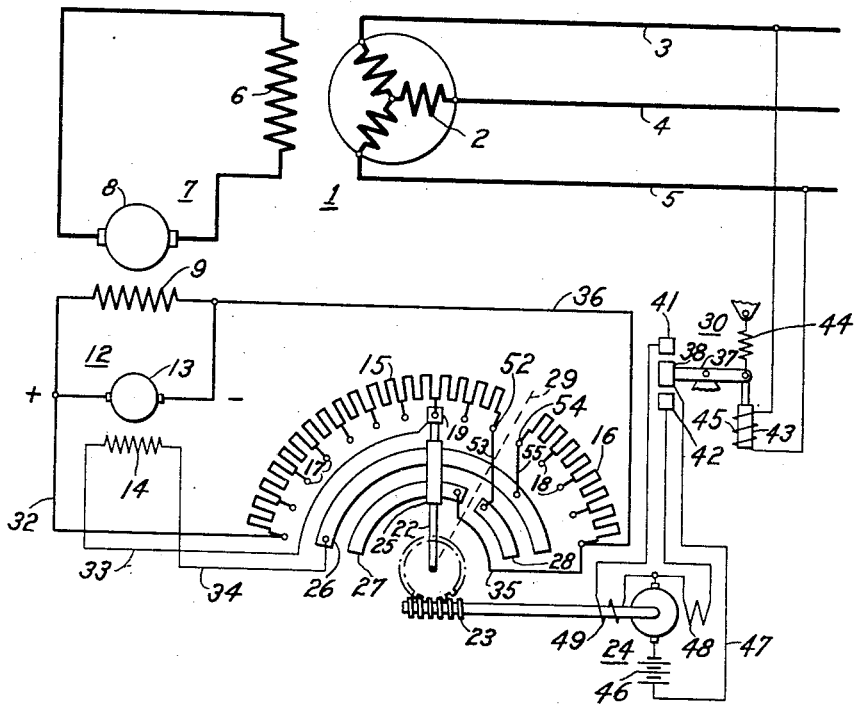
Figure 2:
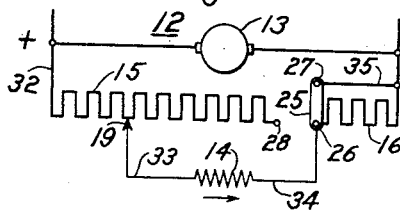
Figure 3:
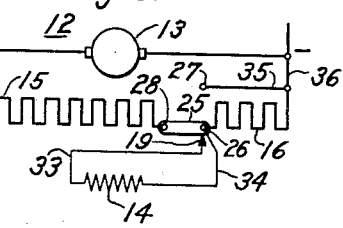
Figure 4:
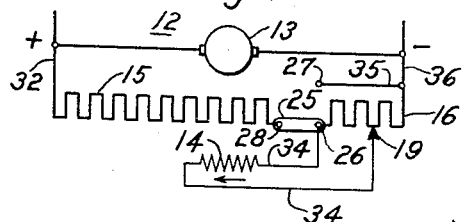
Figure 5:
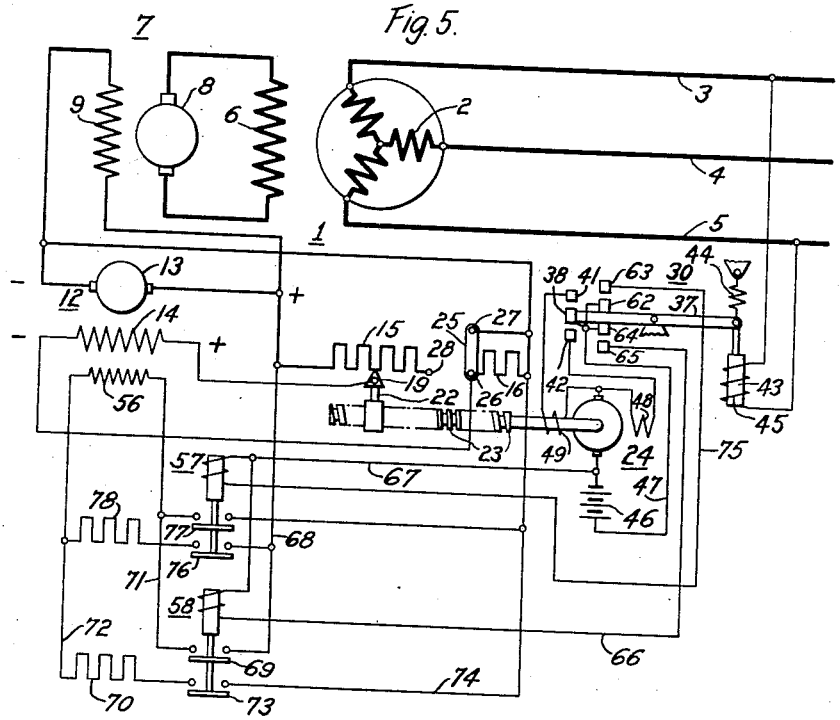
Figure 6:
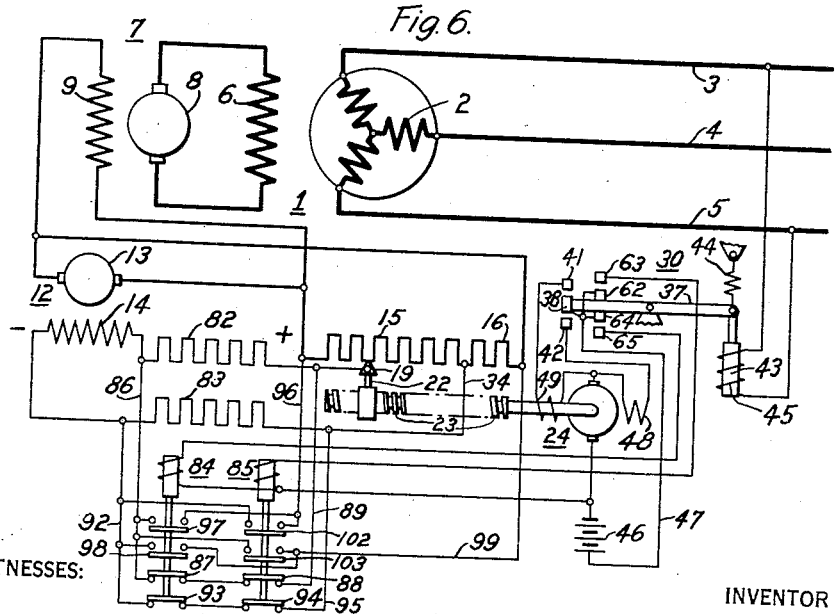

Other objects and advantages of my invention will be apparent from the following description of certain embodiments thereof, reference being had to the accompanying drawings, in which:

Figure 1 is a diagrammatic view illustrating apparatus and circuits embodying the invention, Figs. 2, 3 and 4 are diagrammatic views illustrating the operation of the regulator illustrated in Fig. 1, and Figs. 5 and 6 are diagrammatic views illustrating other embodiments of the invention.

Referring to Fig. 1, a generator 1 is illustrated having an armature winding 2 connected to three-phase circuit conductors 3, 4 and 5 and a field winding 6 connected to be supplied from an exciter generator 7 having an armature winding 8 and a field winding 9. The winding 9 is supplied with excitation current from a pilot generator 12 having an armature winding 13 and a field winding 14. A control mechanism is provided comprising a resistor having two sections 15 and 16 provided, respectively, with contact buttons 17 and 18 that are adapted to be engaged by a movable contact member 19 carried by a rheostat arm 22 and actuated by means of gear mechanism 23 in accordance with the operation of a pilot motor 24. The contact arm 22 is also provided with a contact member 25 that is adapted to engage a contact segment 26 for the entire range of its travel and to engage contact segments 27 or 28 over predetermined portions of its travel. The position represented by the dotted line 29 is a transition point for changing field winding circuit connections, as will be later explained.

With the rheostat arm in the position illustrated in Fig. 1, the field winding 14 is connected in the circuit extending from one terminal of the pilot generator armature winding 13 through conductor 32, a part of the resistor section 15, contact member 19, conductor 33, field winding 14, conductor 34, conducting segment 26, contact member 25, conducting segment 27 and conductors 35 and 36 to the opposite terminal of the armature winding 13. This circuit is diagrammatically illustrated in Fig. 2, it being noted that within the range of movement of the contact member 19 along the contact buttons 17 associated with the resistor section 15, the contact member 25 bridges the conducting segments 26 and 27 to shunt the resistor section 16 from the field winding circuit. Within this range of movement the varying parts of the resistor section 15 are connected in series with the field winding 14 between the contact member 19 and the conductor 32.

A primary relay 30 is provided having an arm 37 carrying a contact member 38 at one end that is adapted to engage one of the fixed contact members 41 or 42, and having an armature 43 connected to the other end thereof adapted to be urged against the force of a spring 44 in accordance with the energization of the relay winding 45 that is connected to be energized in accordance with the voltage between line circuit conductors 3 and 5. If the regulated quantity, which, in this case, is the voltage between conductors 3 and 5, drops below its desired value, the energization of the winding 45 decreases, thus decreasing the force on the armature 43 and permitting the greater force of the spring 44 to move the relay arm 37 in a counter-clockwise direction to cause engagement of the contact member 38 with the contact member 42 to complete a circuit from the battery 46 through conductor 47, the contact members 38 and 42, the motor field winding 48 and the armature winding to the battery 46 to cause the motor 24 to operate in a direction to move the rheostat arm 22 in a counter-clockwise direction to decrease the amount of the resistor section 15 that is in circuit with the field winding 14 and increase the energization of the winding to thereby increase the excitation of the pilot generator 12, exciter generator 7 and of the main machine 1. When the voltage between the conductors 3 and 5 reaches its desired value, the force on the armature 43 will balance the force of the spring 44, causing separation of the contact member 38 from engagement with the contact member 42 to interrupt the circuit through the pilot motor 24 and stop the rheostat arm 22 in its new position. Any suitable anti-hunting means of known type may be provided to prevent overtravel of the rheostat arm.

If the voltage between conductors 3 and 5 increases above its desired value, the energization of the winding 45 increases, causing the pull on the armature 43 to overcome the pull on the spring 44 and cause the contact member 38 to engage the contact member 41 to complete a circuit from the battery 46 through conductor 47, contact members 38 and 41, the field winding 49 of the pilot motor 24 and the armature winding thereof to the battery 46, to cause the pilot motor 24 to operate the rheostat arm 22 in a clockwise direction to increase the part of the resistor section 15 that is included in series with the field winding 14 of the pilot generator, thereby decreasing the excitation of the machines 12, 7 and 1.

In many situations it is necessary to decrease the excitation of the pilot exciter below its residual excitation value, that is to reverse the direction of the field winding current to bring the output voltage of the pilot exciter close to or below zero value. It will be noted that the end of the resistor section 15 terminating in the contact button 52 is connected by conductor 53 to the contact segment 28, and that the adjacent end of the resistor portion 16 is connected to the segment 26 by conductor 55. When, therefore, the rheostat arm 22 has moved in a clockwise direction sufficiently to include the whole of the resistor section 15 in series with the pilot generator field winding 14 and continues to move in that direction, the rheostat contact member 19 moves from the contact button 52 at one end of the resistor portion 15 to the contact button 54 at the adjacent end of the resistor portion 16, the circuit through the bridging contact member 25 interrupts the circuit through the conductor 35 in shunt relation to the resistor 16 and connects the two resistor portions 15 and 16 in series circuit relation, as indicated diagrammatically in Fig. 3. When the rheostat contact member 19 is in engagement with the contact button 54 both ends of the field winding 14 are connected to the conducting segment 26, thus decreasing the field curent to zero. A further movement of the rheostat arm 22 in a clockwise direction causes the rheostat contact member 19 to travel along the successive contact buttons 18 to include varying parts of the resistor portion 16 in shunt relation to the field winding 14 to increase the field winding current in the opposite direction to that which is obtained when the contact member 19 was in engagement with one of the resistor buttons 17 associated with the resistor portion 15. Thus the energization of the field winding 14 is reversed, the resistor portions 15 and 16 being connected in series between the terminals of the pilot exciter armature 13 to form a potentiometer. This range of operation of the rheostat arm 22 is represented by the connections illustrated in Fig. 4.

Referring to Fig. 5, a regulator system is provided corresponding to that illustrated in Fig. 1 with the additional provision of field forcing means. In Fig. 5 the connections of the field winding 14 to the resistor portions 15 and 16 is shown schematically after the fashion illustrated in Figs. 2, 3 and 4. An auxiliary exciter field winding 56 is provided that is adapted to be connected by relay 57 or 58 to the armature winding 13 of the pilot exciter during operation of the rheostat arm 22, if the variation in the regulated quantity from its desired value is sufficient to cause engagement of the relay contact members 62 and 63, or 64 and 65, which requires a slightly greater movement of the relay arm 37 than is necessary to cause engagement of the contact member 38 with the contact member 41 or 42. If, for example, the voltage between the conductors 3 and 5 decreases below the desired value to cause the relay arm 37 to move in a counter-clockwise direction, as above explained, and this decrease is sufficient to cause engagement of the contact members 64 and 65, a circuit will be completed from the battery 46 through conductor 47, the contact members 64 and 65, conductor 66, the winding of the relay 58 and conductor 67 to the other terminal of the battery 46 to operate the relay 58 to its circuit closing position to complete a circuit from the positive terminal of the armature 13 of the exciter generator through conductor 68, relay contact member 69, conductor 71, the auxiliary field winding 56, conductor 72, resistor 70, relay contact member 73 and conductor 74 to the negative terminal of the exciter armature winding 16 to supply current to the auxiliary field winding 56 in a direction to boost the excitation caused by the field winding 14, to thus increase the excitation of the pilot exciter more rapidly than would be occasioned by movement of the rheostat arm 22 alone. This boosting or field forcing takes place while the motor 24 is operating to move the rheostat arm 22 in the manner above explained to increase the excitation of the field winding 14.

If the voltage between conductors 3 and 5 increases above its desired value sufficiently to cause the relay contact member 37 to move in a clockwise direction sufficiently to cause engagement of the contact members 62 and 63, a circuit is completed from one terminal of the battery 46 through conductor 47, contact members 62 and 63, conductor 75, the winding of the relay 57 and conductor 67 to the other terminal of the battery 46 to operate the relay 57 to its circuit closing position. Such operation of the relay 57 completes a circuit from the positive terminal of the armature winding 13 through conductor 68, the relay contact member 76, resistor 78, conductor 72, auxiliary field winding 56, conductor 71, relay contact members 77 and conductor 74 to the negative terminal of the armature winding 13 to energize the auxiliary field winding 56 in the opposite direction from that resulting from closure of the relay 58, to buck the excitation of the main field winding 14 and cause the excitation of the pilot exciter to decrease more rapidly than would be occasioned by movement of the rheostat contact arm 22 alone.

Another embodiment of the invention showing a modified field forcing connection is illustrated in Fig. 6. It will be noted that in Fig. 5, the resistor portions 15 and 16 are shown connected as in Figs. 1 and 2, and in Fig. 6 these resistor portions are shown permanently connected in series to form a potentiometer. It will be appreciated that in either of the embodiments illustrated in Figs. 5 and 6 the resistor portions 15 and 16 may be connected to form a continuous resistor, as in Fig. 6, or connected to be subject to the switching arrangements provided in the embodiment illustrated in Fig. 1. In the embodiment illustrated in Fig. 6, a single pilot exciter field winding 14 is employed, a resistor 82 being connected between one terminal thereof and the contact member 19 and a resistor 83 being connected between the other terminal thereof and the conductor 34 that is connected to the resistor consisting of portions 15 and 16. Field forcing relays 84 and 85 are provided which in their illustrated position complete a circuit in shunt relation to the resistors 82 and 83. The circuit in shunt relation to resistor 82 extends through conductor 86, relay contact members 87 and 88 and conductor 89, and the circuit in shunt relation to resistor 83 extends through conductor 92, relay contact members 93 and 94 and conductor 95. With the contact arm 22 in the illustrated position, the circuit through the field winding 14 extends from the positive terminal of the armature winding 13 through the left-hand part of resistor portion 15, contact member 19, conductor 89, relay contact members 88 and 87, conductor 86, the field winding 14, conductor 92, relay contact members 93 and 94, conductors 95 and 34 and through the resistor portion 16 to the other terminal of the armature winding 13. If the voltage between conductors 3 and 5 decreases to permit the relay arm 37 to move in a counter-clockwise direction sufficiently to cause engagement of the contact members 64 and 65, a circuit is completed through these contact members and the winding of the field forcing relay 84 to actuate the relay upwardly from its illustrated position to short circuit the left part of the resistor portion 15 and increase the excitation of the field winding abruptly. This circuit extends from the positive terminal of the armature winding 13 through conductor 96, the relay contact member 97, conductor 86, the winding 14, conductor 92, relay contact member 98 and conductor 99 to the negative terminal of the exciter generator 13 and impresses the full exciter generator armature voltage on the field winding 14 to rapidly increase the excitation thereof while the rheostat arm 22 is being actuated by the motor 24 in a direction to maintain an increased excitation thereof. As the regulated quantity approaches its desired value, the circuit through relay contact members 64 and 65 is again interrupted and the field forcing relay 84 drops to its illustrated position interrupting the above traced circuit through relay contact members 97 and 98 and reestablishing the above traced field winding circuit through relay contact members 87 and 93 that is controlled by the position of the rheostat arm 22.

If the voltage between conductors 3 and 5 increases above its desired value sufficiently to cause the relay arm 37 to move in a clockwise direction to cause engagement of the contact members 62 and 63, a circuit is completed through the winding of the field forcing relay 85. Thus while the rheostat arm 22 is being moved by the motor 24 in a direction to decrease the excitation of the field winding 14, a circuit is completed by the field forcing relay 85 extending from the positive terminal of the pilot exciter armature winding 13 through conductor 96, relay contact member 102, conductor 92, field winding 14, conductor 86, relay contact member 103 and conductor 99 to the negative terminal of the armature winding 13 to apply full pilot exciter armature voltage to the field winding 14 in the reverse direction. An abrupt change in excitation is thus effected during the operation of the pilot motor 24 to move the rheostat contact member 19 to a position to decrease the field winding excitation to a lesser value.

The purpose of the resistors 82 and 83 is to provide a permanent connection between the terminals of the field winding 14 and the armature winding 13, so that upon operation of the field forcing relays 84 and 85, as above described, the field winding circuit is never interrupted but is modified to cause the above described changes in the field winding current.

Many modifications in the apparatus and circuits illustrated may be provided within the scope of my invention and I do not wish to be limited otherwise than by the scope of the appended claims.

I claim as my invention:

1. In a regulator system, a dynamo-electric machine having a field winding, means for controlling the excitation of said field winding comprising a resistor having two sections, means responsive to the regulated quantity for introducing varying parts of one resistor section in series with the field winding over a predetermined range in the required excitation of said machine, and for connecting said two resistor sections in series and varying the connection of said field winding in shunt relation to a portion of said resistor over another predetermined range in the required excitation of said machine.

2. In a regulator system, a dynamo-electric machine having a field winding, means for controlling the excitations of said field winding comprising a resistor having two sections, means responsive to the regulated quantity for introducing varying parts of one resistor section in series with the field winding to control the excitation of said machine above the residual magnetism thereof and for connecting said two resistor sections in series and varying the connection of said field winding in shunt relation to a portion of said resistor for controlling the excitation of said machine below its residual magnetism.

3. In a regulator system, a dynamo-electric machine having a field winding, means for controlling the excitation of said field winding comprising a resistor having two sections, means responsive to the regulated quantity for shunting one of said resistor sections from said field winding circuit and for introducing varying parts of one resistor section in series with the field winding to control the current through said field winding in one direction, said means being effective to connect said two resistor sections in series circuit relation and for varying the field circuit connections in shunt relation to said first named resistor sections for controlling the current through said field winding in the other direction.

4. In a regulator system, a dynamo-electric machine having a field winding, means for controlling the excitation of said field winding comprising a resistor having two sections, means responsive to the regulated quantity for introducing varying parts of the other resistor section in series with the field winding over a predetermined range in the required excitation of said machine, said means being effective upon a decrease in the required excitation below a value corresponding to the inclusion of the whole of said second named resistor section in said field winding circuit for connecting said two resistor sections in series and for short circuiting said field winding, and for thereafter connecting the field winding in shunt relation to a variable portion of said resistor with a polarity to reverse the direction of current through said field winding.

5. In a regulator system, in combination, a dynamo-electric machine having a field winding, means for controlling the excitation of said field winding comprising a resistor having two sections, one end of one section being connected to one armature terminal and one end of the other section being connected to the other armature terminal, means responsive to the regulated quantity for establishing a circuit through said field winding in series circuit relation with a variable part of one of said sections for varying the excitation over a predetermined range, and for establishing a circuit through said field winding in shunt relation to a variable part of one of said resistor sections connected in a circuit between the armature terminals of said machine for reversing the direction of excitation of said field winding.

6. In a regulator system, in combination, an electric generator having a field winding and an exciter generator for supplying current thereto, means for governing the excitation of the exciter generator comprising a motor operated mechanism controlled in response to the voltage of said generator, said mechanism including a resistor having two sections, means for establishing a circuit through one of said sections in series with the exciter field winding and for varying the resistance thereof for controlling the excitation over a predetermined range, and means for establishing a circuit through said two resistor sections and for varying the connection of the exciter field winding in shunt relation to varying portions thereof for controlling the excitation over another predetermined range.

7. In a regulator system, in combination, a dynamo-electric machine having a field winding, means for controlling the excitation of said field winding comprising a regulating resistor having two sections, mechanism for establishing a circuit through said field winding in series circuit relation with a variable part of one of said sections for controlling the excitation over a predetermined range and for establishing a circuit through said field winding in shunt relation to a variable part of one of said resistor sections in a direction to reverse the direction of field excitation for controlling the excitation over another predetermined range, and control means responsive to the regulated quantity for governing said mechanism.

8. In a regulator system, in combination, a dynamo-electric machine having a field winding, means for controlling the excitation of said field winding comprising a regulating resistor having two sections, mechanism for establishing a circuit through said field winding in series circuit relation with a variable part of one of said sections for controlling the excitation over a predetermined range, and for establishing a circuit through said field winding in shunt relation to a variable part of one of said resistor sections in a direction to reverse the direction of field excitation for controlling the excitation over another predetermined range, and control means responsive to the regulated quantity for governing said mechanism, and means responsive to a predetermined variation in the regulated quantity for effecting an abrupt change in excitation during operation of said mechanism.

9. In a regulator system, in combination, a dynamo-electric machine having a field winding, means for controlling the excitation of said field winding comprising a regulating resistor having two sections, mechanism for establishing a circuit through said field winding in series circuit relation with a variable part of one of said sections for controlling the excitation over a predetermined range and for establishing a circuit through said field winding in shunt relation to a variable part of one of said resistor sections in a direction for reversing the direction of field excitation for controlling the excitation over another predetermined range, control means responsive to the regulated quantity for governing said mechanism, and means responsive to a predetermined variation in the regulated quantity from its desired value for shunting said regulating resistor from the field winding circuit for effecting a sudden change in the supplied excitation during the operation of said mechanism.

EDWIN L. HARDER.